United States Patent
Reitemann

(10) Patent No.: US 10,436,084 B2
(45) Date of Patent: Oct. 8, 2019

(54) UTILITY VEHICLE FLUID COOLING

(71) Applicant: AGCO International GmbH, Neuhausen (CH)

(72) Inventor: Gabriel Reitemann, oy_Mittelberg (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 15/641,945

(22) Filed: Jul. 5, 2017

(65) Prior Publication Data

US 2018/0010493 A1    Jan. 11, 2018

(30) Foreign Application Priority Data

Jul. 6, 2016    (GB) .................................... 1611777.2

(51) Int. Cl.
| | | |
|---|---|---|
| *F28F 19/00* | (2006.01) | |
| *F01M 5/00* | (2006.01) | |
| *F01P 7/04* | (2006.01) | |
| *F15B 21/0423* | (2019.01) | |
| *B60K 11/02* | (2006.01) | |
| *F01M 1/00* | (2006.01) | |

(52) U.S. Cl.
CPC ............ *F01M 5/002* (2013.01); *F01P 7/044* (2013.01); *F15B 21/0423* (2019.01); *B60K 11/02* (2013.01); *B60Y 2200/221* (2013.01); *F01M 1/00* (2013.01); *F01P 2060/04* (2013.01); *F01P 2060/045* (2013.01)

(58) Field of Classification Search
CPC ....... F01M 5/002; F15B 21/042; B60K 11/02; B60Y 2200/221; F01P 7/044; F01P 2060/04; F01P 2060/045; F16D 31/02; F02B 29/045
USPC ............................................................ 165/41
See application file for complete search history.

(56) References Cited

U.S. PATENT DOCUMENTS

| | | | |
|---|---|---|---|
| 6,227,221 B1 * | 5/2001 | Schmitz .................. | F16D 31/02 137/1 |
| 6,349,882 B1 | 2/2002 | Kita et al. | |
| 6,354,089 B1 | 3/2002 | Lech et al. | |
| 6,868,809 B1 | 3/2005 | Robb | |

(Continued)

FOREIGN PATENT DOCUMENTS

| | | |
|---|---|---|
| EP | 1870576 A1 | 12/2007 |
| EP | 2792796 A2 | 10/2014 |
| EP | 2889492 A1 | 7/2015 |

OTHER PUBLICATIONS

UK Intellectual Property Office, International Search Report for Priority Application No. GB1611777.2, dated Dec. 20, 2016.

(Continued)

*Primary Examiner* — Davis D Hwu

(57) ABSTRACT

A cooling system for a utility vehicle comprises a first fluid circuit including a first fluid such as hydraulic oil and a second fluid circuit including a second fluid such as a coolant or lubricant. A heat exchanger couples the first and second fluid circuits enabling transfer of heat from one of the first and second fluids to the other. A fluid cooler in the first fluid circuit has a fan arranged to direct an airflow towards it, which fan is a hydraulically driven device connected in the first fluid circuit and driven by flow of the first fluid.

8 Claims, 3 Drawing Sheets

(56) References Cited

U.S. PATENT DOCUMENTS

2015/0352943 A1* 12/2015 Hoffmann .............. B60K 11/02
                                                                                       180/65.21
2015/0375973 A1   12/2015 Sakai et al.
2016/0090899 A1*  3/2016 Hayes .................. F02B 29/045
                                                                                       165/51

OTHER PUBLICATIONS

European Patent Office, International Search Report for related Application No. EP17176217, dated Oct. 27, 2017.

* cited by examiner

UTILITY VEHICLE FLUID COOLING

BACKGROUND OF THE INVENTION

Field of Invention

The present invention relates to cooling systems for utility vehicles, such as self-propelled agricultural machines, and more particularly to arrangements for cooling working fluids such as lubricants and hydraulic fluids.

Description of Related Art

A utility vehicle having first and second hydraulic circuits provided with first and second fluids, wherein the fluids are to be kept apart, is described in U.S. Pat. No. 6,354,089. In addition to the use of a liquid-liquid heat exchanger, providing a means for transferring heat from the hotter of the first and second fluids to the other, the system of U.S. Pat. No. 6,354,089 includes at least one fluid cooler for cooling at least one of the fluids. The or each of the fluid coolers are generally configured as similar to a radiator and mounted in front of an engine cooling radiator of the vehicle. A cooling fan driven by the vehicle engine drives air over or through the radiators to produce liquid-air cooling of the fluid therein.

OVERVIEW OF THE INVENTION

In accordance with the invention there is provided a cooling system for a utility vehicle comprising:
 a first fluid circuit including a first fluid;
 a second fluid circuit including a second fluid;
 a heat exchanger coupled into both the first and second fluid circuits enabling transfer of heat from one of the first and second fluids to the other;
 a fluid cooler in the first fluid circuit, and
 a fan arranged to direct an airflow towards the fluid cooler, wherein the fan is a hydraulically driven device connected in the first fluid circuit and driven by flow of the first fluid. With such an arrangement, the fan speed may be controlled by regulation of the flow rate of the first fluid, which in turn permits regulation of the temperature of the first fluid. With regulation of the temperature of the first fluid, the temperature of the second fluid may be controlled through the operation of the heat exchanger.

The cooling system may further comprise a third fluid circuit including a third fluid, with a heat exchanger coupled into both the first and third fluid circuits to enable transfer of heat from one of the first and third fluids to the other. With this arrangement, the temperature of both the second and third fluid may be controlled whilst keeping them isolated from one another.

The present invention also provides a utility vehicle including a cooling system as recited above. In such a utility vehicle, the second fluid may be a lubricating fluid and the second circuit a transmission lubrication circuit of the vehicle. Where the cooling system includes a third circuit, the second and third circuits may be coupled to deliver lubricating fluid to respective ones of rear and front axles of the vehicle: alternately, in the absence of a third circuit, the second circuit may be coupled to deliver lubricating fluid to both front and rear axles of the vehicle.

Where the first fluid is a hydraulic fluid, the utility vehicle may include a hydraulic fluid circuit comprising:
 a reservoir of said hydraulic fluid;
 a fixed or variable displacement pump arranged to draw hydraulic fluid from the reservoir and output the same under pressure;
 one or more consumers mounted to the vehicle and coupled to receive pressurized hydraulic fluid from the pump;
 a return line coupled to return hydraulic fluid from the one or more consumers to the reservoir. In such an arrangement, the first fluid circuit and hydraulic fluid circuit preferably share a common reservoir, and may further share a common return line to the reservoir, which return line includes at least one filter.

BRIEF DESCRIPTION OF THE DRAWINGS

Further advantages of the invention will become apparent from reading the following description of specific embodiments with reference to the appended drawings in which.

DETAILED DESCRIPTION OF THE INVENTION

Figure 1:
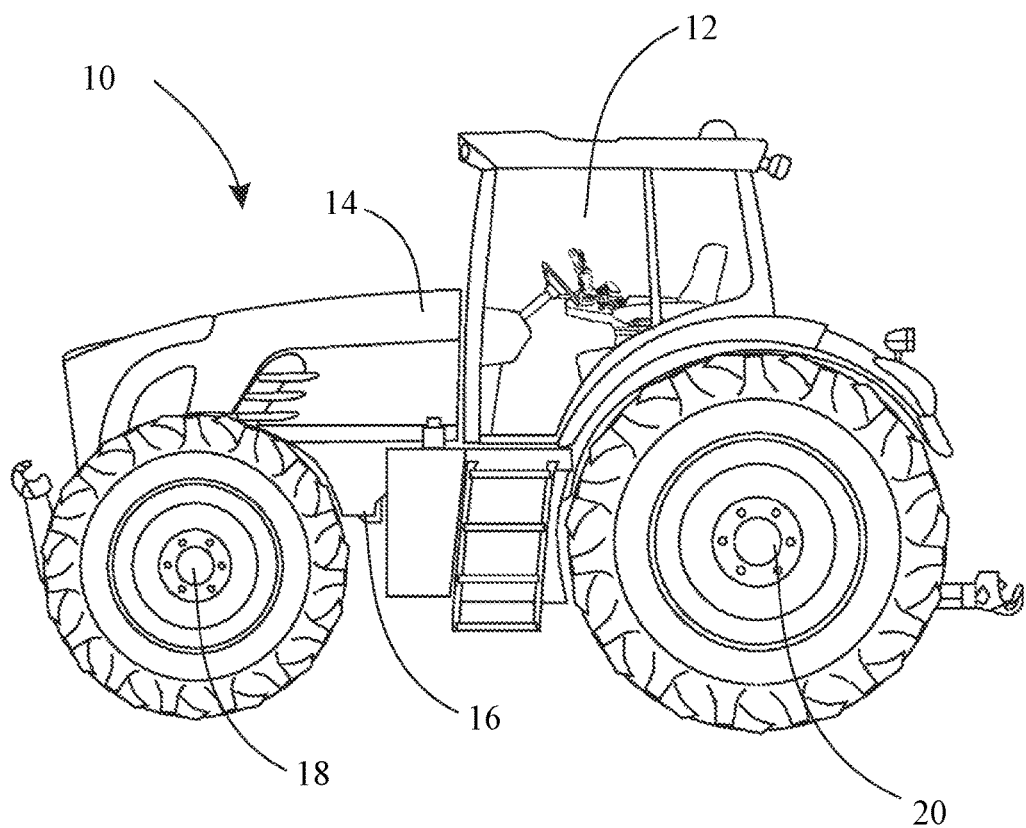
FIG. 1 is a representation of a tractor.

Referring to FIG. 1, a utility vehicle in the form of a tractor 10 is shown having a cab 12 and an engine compartment 14. A chassis 16 which is partly visible connects front wheel suspension and steering assembly 18 and rear axle assembly 20.

Figure 2:
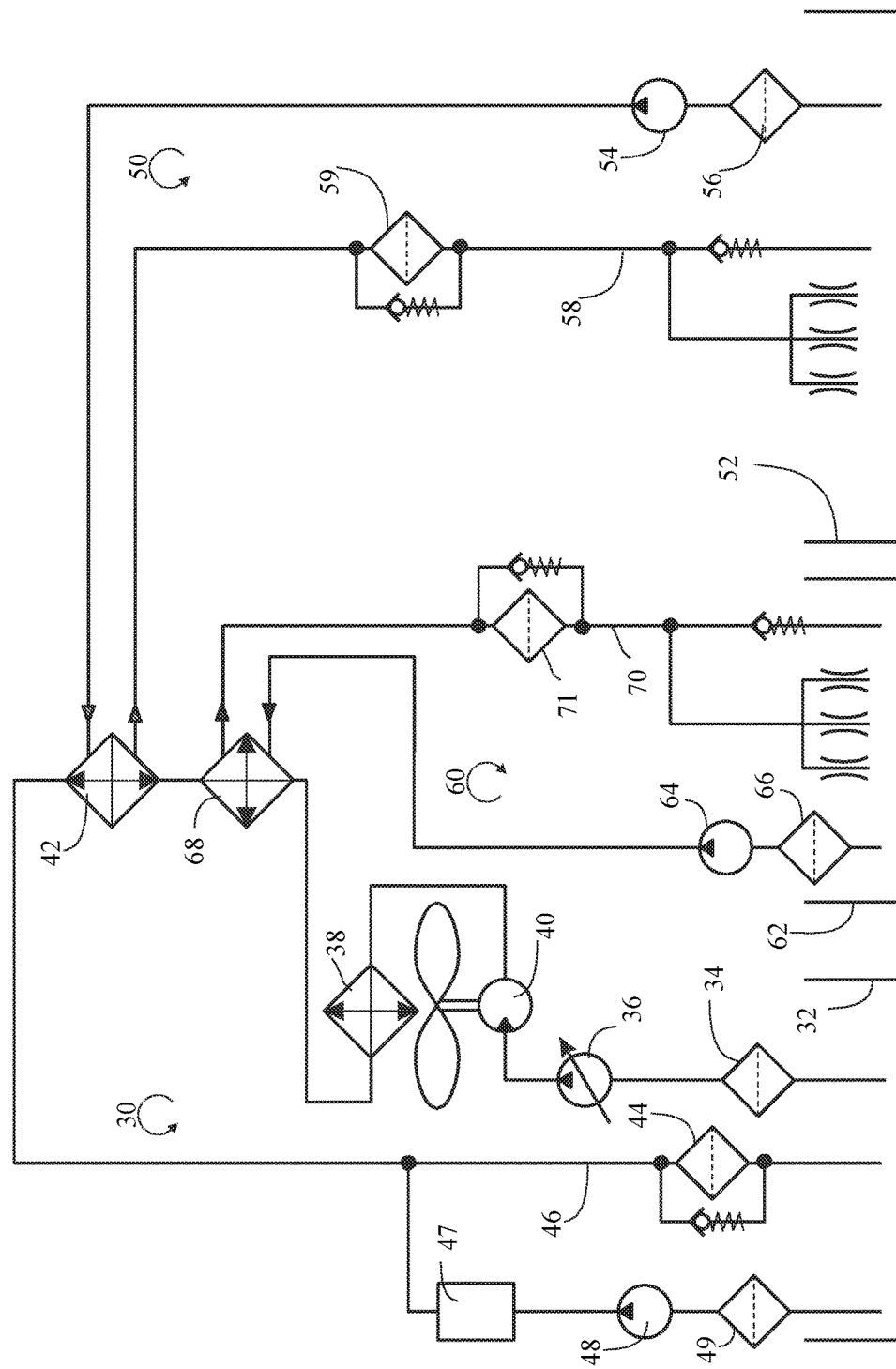
FIG. 2 shows a first embodiment of a cooling and lubrication system for the tractor of FIG. 1.

FIG. 2 shows a first embodiment of a cooling and lubrication system for the tractor of FIG. 1. A first fluid circuit represented generally at 30 carries a first fluid in the form of hydraulic fluid drawn from a first reservoir 32 via a first filter 34 by variable rate pump 36. The first circuit includes a fluid cooler 38 in the form of an oil-air heat exchanger. A hydraulically driven fan 40 is included in the first circuit, upstream of the fluid cooler 38 and driven by the flow of hydraulic fluid in the circuit 30. Downstream of the fluid cooler 38 there is a further heat exchanger 42 (described in further detail below) and a further filter 44 in a fluid return line 46 to the reservoir 32.

The fan 40 is directed towards the fluid cooler 38. The fluid channel within the fluid cooler 38 has greater cross-section than the fluid lines connecting the components of the first circuit such that fluid flow through the cooler is at a slower rate than fluid flow in the lines. By varying the speed of the fan 40, by control of the fluid flow rate delivered by pump 36, the temperature of the hydraulic fluid flowing out from cooler 38 in circuit 30 towards heat exchanger 42 may be regulated.

The reservoir 32 is also shared by a working hydraulic circuit for the tractor 10, whereby a fixed displacement pump 48 provides a supply of pressurized fluid via filter 49 to operate one or more consumers 47 (such as hydraulic lifting cylinders of a front linkage) mounted to the tractor. The working hydraulic circuit may return the fluid directly to the reservoir 32 or, as shown, may share the return line 46 and filter 44 with the first circuit 30.

A second fluid circuit represented generally at 50 carries a second fluid in the form of a transmission lubricant drawn from a second reservoir 52 provided by a differential housing of the rear axle assembly 20 of the tractor 10. A fixed displacement pump 54 draws the lubricant from the reservoir 52 via a filter 56 and pumps it through the further heat exchanger 42 in the first circuit 30 before returning to the reservoir 52 via return line 58 including filter 59. The further heat exchanger 42 is an oil-oil heat exchanger allowing the transfer of heat between the liquids of the first and second circuits 30, 50. Control of the speed of the fan 40 in the first circuit 30 is thereby used to regulate the temperature of the fluid (lubricant) in the second circuit 50.

A third fluid circuit represented generally at 60, substantially the same as the second circuit 50, carries a third fluid in the form of a transmission lubricant drawn from a third reservoir 62 provided by an axle housing of the front wheel suspension and steering assembly 18 of the tractor 10. A fixed displacement pump 64 draws the lubricant from the reservoir 62 via a filter 66 and pumps it through a still further heat exchanger 68 in the first circuit 30 before returning to the reservoir 62 via return line 70 including filter 71. The still further heat exchanger 68 is an oil-oil heat exchanger allowing the transfer of heat between the liquids of the first and third circuits 30, 60. As with the further heat exchanger 42 of the second circuit, the still further heat exchanger of the third circuit is positioned downstream of the fluid cooler 38 and fan 40 of the first circuit. Control of the speed of the fan 40 in the first circuit 30 is thereby used to regulate the temperature of the fluid (lubricant) in the third circuit 50.

Figure 3:
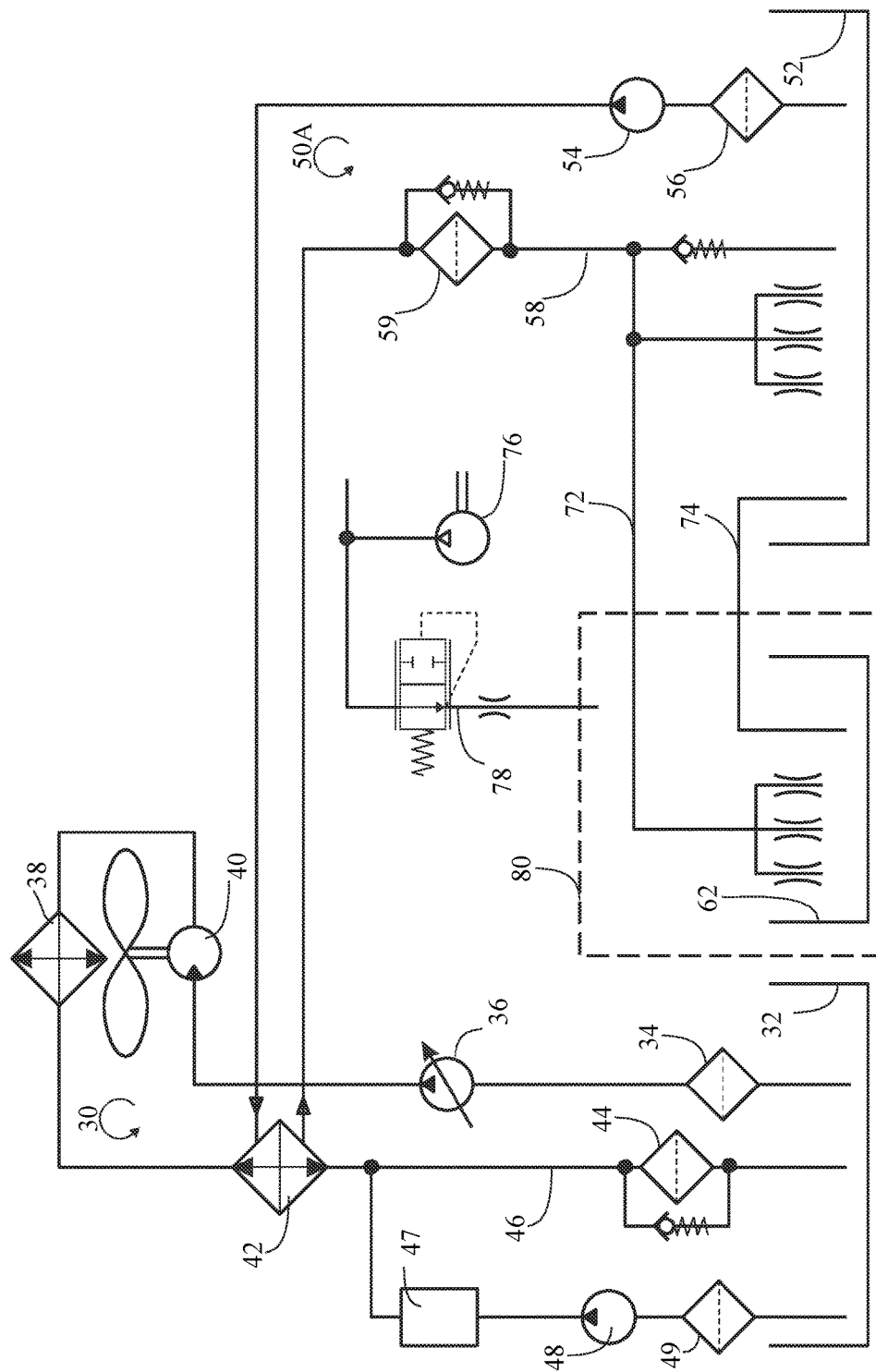
FIG. 3 shows a further embodiment of a cooling and lubrication system for the tractor of FIG. 1.

FIG. 3 shows a second embodiment of a cooling and lubrication system for the tractor of FIG. 1. The first circuit 30 is unchanged from the embodiment of FIG. 2, save for the omission of the still further heat exchanger 68, and will not be described again.

Recognising that the front and rear axle assemblies use the same type of lubricating and cooling fluid, the second and third circuits of FIG. 2 are merged to a single circuit 50A requiring only a single heat exchanger 42 in the first circuit and removing the need for the pump 64 and filter 66 of the third circuit.

A supply line 72 carries lubricant from the downstream side of the heat exchanger 42 to the third reservoir 62 provided by the axle housing of the front wheel suspension and steering assembly 18 of the tractor 10. A return line 74 carries surplus lubricant from the third reservoir 62 back to the second reservoir 52. The outflow opening from the third reservoir 62 into the return line 74 is positioned to allow flow into the line 74 when a level of lubricating fluid in the second reservoir exceeds a predetermined level, to avoid draining of the third reservoir 62 when the tractor is traversing an incline. To urge the surplus lubricant along the return line 74, a pressurized gas source 76 is connectable via a pressure reduction valve or orifice 78 to introduce pressurized gas to the front axle housing (represented by dashed line 80) such as to force the lubricating fluid into the return line 74 when the level of lubricating fluid in the third reservoir 62 exceeds the predetermined level. The pressurized gas source 76 is suitably a further pump arranged to take in ambient air and output the same under relatively low pressure. Alternatively, the pressurized gas source 76 may be provided by an already available air supply system used to supply air to the tractor brake system or tyre pressure control system, e.g. the air compressor driven by the engine. To avoid pressure build-up, the rear transmission housing includes an air vent (not shown) to exhaust pressurized air introduced to the front axle and carried along return line 74 when the fluid level in the third reservoir 62 is below the predetermined level.

In the foregoing the applicants have described a cooling system for a utility vehicle which comprises a first fluid circuit 30 including a first fluid such as hydraulic oil and a second fluid circuit 50 including a second fluid such as a coolant or lubricant. A heat exchanger 42 couples the first and second fluid circuits enabling transfer of heat from one of the first and second fluids to the other. A fluid cooler 38 in the first fluid circuit has a fan 40 arranged to direct an airflow towards it, which fan 40 is a hydraulically driven device connected in the first fluid circuit and driven by flow of the first fluid.

From reading of the present disclosure, other modifications will be apparent to those skilled in the art. Such modifications may involve other features which are already known in the field of vehicle cooling systems and component parts therefore and which may be used instead of or in addition to features described herein. For example, fixed displacement pumps may be replaced by variable displacement pumps or vice versa. Furthermore, other type of fluid filtration, or means to bypass heat exchangers or fluid coolers under low temperature conditions, may be provided.

The invention claimed is:

1. A cooling system for a utility vehicle comprising:
   a first fluid circuit including a first fluid;
   a second fluid circuit including a second fluid, wherein the second fluid is not mixed with the first fluid;
   a heat exchanger coupled into the first fluid circuit and the second fluid circuit enabling transfer of heat from one of the first and second fluids to the other;
   a fluid cooler in the first fluid circuit, and
   a fan arranged to direct an airflow towards the fluid cooler to cool the first fluid in the first fluid circuit, wherein the fan is a hydraulically driven device connected in the first fluid circuit and driven by flow of the first fluid as the first fluid passes through the first fluid circuit.

2. The cooling system as claimed in claim 1, further comprising:
   a third fluid circuit including a third fluid; and
   a heat exchanger coupled into the first fluid circuit and the third fluid circuit enabling transfer of heat from one of the first and third fluids to the other.

3. The utility vehicle including the cooling system as claimed in claim 1, wherein the second fluid is a lubricating fluid and the second fluid circuit is a transmission lubrication circuit of the vehicle.

4. The utility vehicle as claimed in claim 3, wherein the second fluid circuit is coupled to deliver lubricating fluid to a front and a rear axle of the vehicle.

5. The utility vehicle including the cooling system as claimed in claim 2, wherein the second fluid and the third fluid are lubricating fluids and the second fluid circuit and the third fluid circuit are coupled to deliver lubricating fluid to respective ones of rear and front axles of the vehicle.

6. The utility vehicle as claimed in claim 3, wherein the first fluid is a hydraulic fluid and the vehicle includes a hydraulic fluid circuit comprising:
   a reservoir of said hydraulic fluid;
   a pump arranged to draw hydraulic fluid from the reservoir and output the fluid under pressure;
   one or more consumers mounted to the vehicle and coupled to receive pressurized hydraulic fluid from the pump; and
   a return line coupled to return hydraulic fluid from the one or more consumers to the reservoir.

7. The utility vehicle as claimed in claim 6, wherein the first fluid circuit and the hydraulic fluid circuit share a common reservoir.

8. The utility vehicle as claimed in claim 7, wherein the first fluid circuit and the hydraulic fluid circuit share a common return line to the common reservoir, which said return line includes at least one filter.

* * * * *